(12) United States Patent
Chapeau

(10) Patent No.: US 12,709,210 B2
(45) Date of Patent: Aug. 18, 2026

(54) MANAGEMENT OF AXLE DRIVEN GENERATOR IN A TRANSPORT REFRIGERATION SYSTEM

(71) Applicant: Carrier Corporation, Palm Beach Gardens, FL (US)

(72) Inventor: Lucas Chapeau, Isneauville (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 768 days.

(21) Appl. No.: 18/177,462

(22) Filed: Mar. 2, 2023

(65) Prior Publication Data

US 2023/0286430 A1 Sep. 14, 2023

Related U.S. Application Data

(60) Provisional application No. 63/317,609, filed on Mar. 8, 2022.

(51) Int. Cl.
*B60P 3/00* (2006.01)
*B60H 1/32* (2006.01)
(Continued)

(52) U.S. Cl.
CPC .............. *B60P 3/20* (2013.01); *B60H 1/3208* (2013.01); *B60H 1/3226* (2013.01); *B60K 25/08* (2013.01); *F16D 48/00* (2013.01); *H02K 7/108* (2013.01); *H02K 7/1846* (2013.01); *H02P 9/06* (2013.01); *F16D 2500/10437* (2013.01); *F16D 2500/1107* (2013.01); *F16D 2500/3101* (2013.01); *F16D 2500/316* (2013.01)

(58) Field of Classification Search
CPC ....... B60P 3/20; B60H 1/3208; B60H 1/3226; B60K 25/08; F16D 48/00; F16D 2500/10437; F16D 2500/1107; F16D 2500/3101; F16D 2500/316; H02K 7/108; H02K 7/1846; H02P 9/06
USPC ........................................................ 296/24.35
See application file for complete search history.

(56) References Cited

U.S. PATENT DOCUMENTS 6,793,034 B2 9/2004 Raftari et al.
7,102,245 B2 9/2006 Duggan et al.
(Continued)

FOREIGN PATENT DOCUMENTS

EP 3427992 A1 1/2019
EP 3769984 A1 1/2021
(Continued)

OTHER PUBLICATIONS

European Search Report for Application No. 23160586.6, Issued Jul. 6, 2023, 7 Pages.

*Primary Examiner* — Steven O Douglas
(74) *Attorney, Agent, or Firm* — CANTOR COLBURN LLP

(57) ABSTRACT

A transport refrigeration system includes a trailer having an axle; a transport refrigeration unit mounted to the trailer, transport refrigeration unit configured to cool a cargo compartment of the trailer; an axle driven generator connected to the axle, the axle driven generator configured to provide power to the transport refrigeration unit; a controller in communication with the axle driven generator, the controller configured to disengage the axle driven generator from the axle in response to the presence of one or more disengagement conditions.

17 Claims, 4 Drawing Sheets

(51) Int. Cl.

| | |
|---|---|
| ***B60K 25/08*** | (2006.01) |
| ***B60P 3/20*** | (2006.01) |
| ***F16D 48/00*** | (2006.01) |
| ***H02K 7/108*** | (2006.01) |
| ***H02K 7/18*** | (2006.01) |
| ***H02P 9/06*** | (2006.01) |

(56) References Cited

U.S. PATENT DOCUMENTS

| | | | |
|---|---|---|---|
| 7,547,980 | B2 | 6/2009 | Harrison |
| 7,699,737 | B2 | 4/2010 | Berhan |
| 8,095,287 | B2 | 1/2012 | Beechie et al. |
| 8,204,657 | B2 | 6/2012 | Buszek et al. |
| 8,220,570 | B1 | 7/2012 | Knickerbocker |
| 8,295,950 | B1 | 10/2012 | Wordsworth et al. |
| 8,535,201 | B2 | 9/2013 | Kuang et al. |
| 8,776,928 | B2 | 7/2014 | Stover, Jr. et al. |
| 9,126,581 | B2 | 9/2015 | Swales et al. |
| 9,278,619 | B2 | 3/2016 | Stadler et al. |
| 9,389,007 | B1 | 7/2016 | Mckay |
| 9,707,844 | B2 | 7/2017 | Arnold et al. |
| 10,300,831 | B2 | 5/2019 | Dziuba et al. |
| 11,021,066 | B2 | 6/2021 | Kooi |
| 11,192,451 | B2 | 12/2021 | Schumacher et al. |
| 11,260,723 | B2 | 3/2022 | Schumacher et al. |
| 2005/0127750 | A1 | 6/2005 | Führer et al. |
| 2011/0221265 | A1 | 9/2011 | Busack et al. |
| 2012/0187749 | A1 | 7/2012 | Grady |
| 2018/0093571 | A1 | 4/2018 | Hall et al. |
| 2020/0198519 | A1 | 6/2020 | Liao et al. |
| 2020/0233410 | A1 | 7/2020 | Burns et al. |
| 2021/0197645 | A1* | 7/2021 | Larson ................. B60H 1/3232 |
| 2021/0206261 | A1* | 7/2021 | Renault .............. B60H 1/00364 |
| 2021/0213806 | A1 | 7/2021 | Saroka et al. |
| 2021/0252947 | A1 | 8/2021 | She et al. |
| 2021/0260964 | A1 | 8/2021 | Saroka et al. |
| 2023/0286477 | A1* | 9/2023 | Chapeau ................... B60T 7/20 |

FOREIGN PATENT DOCUMENTS

| | | | |
|---|---|---|---|
| EP | 3795404 | A1 | 3/2021 |
| EP | 3943330 | A1 | 1/2022 |
| WO | 2020072301 | A1 | 4/2020 |
| WO | 2020072706 | A1 | 4/2020 |

* cited by examiner

MANAGEMENT OF AXLE DRIVEN GENERATOR IN A TRANSPORT REFRIGERATION SYSTEM

CROSS-REFERENCE TO RELATED APPLICATIONS

This application claims the benefit of U.S. Provisional Application No. 63/317,609, filed Mar. 8, 2022, all of which are incorporated herein by reference in their entirety.

BACKGROUND

The subject matter disclosed herein generally relates to transport refrigeration systems, and more specifically to management of an axle driven generator used to power a transport refrigeration system.

Transport refrigeration systems may use an axle driven generator to power a transport refrigeration unit configured to cool a cargo compartment of a truck or trailer. Axle driven generators apply torque to the axle when generating power. This torque may lead to wheel blocking in certain conditions.

BRIEF SUMMARY

According to one embodiment, a transport refrigeration system includes a trailer having an axle; a transport refrigeration unit mounted to the trailer, transport refrigeration unit configured to cool a cargo compartment of the trailer; an axle driven generator connected to the axle, the axle driven generator configured to provide power to the transport refrigeration unit; a controller in communication with the axle driven generator, the controller configured to disengage the axle driven generator from the axle in response to the presence of one or more disengagement conditions.

In addition to one or more of the features described above, or as an alternative, further embodiments may include wherein the one or more disengagement conditions include an antilock brake system of the trailer actively controlling brakes of the trailer.

In addition to one or more of the features described above, or as an alternative, further embodiments may include wherein the one or more disengagement conditions include a roll stability support system of the trailer actively controlling stability of the trailer.

In addition to one or more of the features described above, or as an alternative, further embodiments may include wherein the one or more disengagement conditions include a connection with a trailer electronic brake system is absent.

In addition to one or more of the features described above, or as an alternative, further embodiments may include wherein the one or more disengagement conditions include a wheel blocking risk on the trailer.

In addition to one or more of the features described above, or as an alternative, further embodiments may include wherein the one or more disengagement conditions include a fault in a trailer electronic brake system.

In addition to one or more of the features described above, or as an alternative, further embodiments may include wherein the one or more disengagement conditions include a fault in the transport refrigeration unit.

In addition to one or more of the features described above, or as an alternative, further embodiments may include wherein after disengaging the axle driven generator from the axle, the controller initiates reengagement of the axle driven generator with the axle in response to an absence of the one or more disengagement conditions.

In addition to one or more of the features described above, or as an alternative, further embodiments may include wherein reengagement of the axle driven generator with the axle includes increasing nominal power of the axle driven generator over time.

According to another embodiment, a method of controlling an axle driven generator connected to an axle of a vehicle includes disengaging the axle driven generator from the axle in response to the presence of one or more disengagement conditions.

In addition to one or more of the features described above, or as an alternative, further embodiments of the method may include wherein the one or more disengagement conditions include an antilock brake system actively controlling brakes of the vehicle.

In addition to one or more of the features described above, or as an alternative, further embodiments of the method may include wherein the one or more disengagement conditions include a roll stability support system actively controlling stability of the vehicle.

In addition to one or more of the features described above, or as an alternative, further embodiments of the method may include wherein the one or more disengagement conditions include a connection with an electronic brake system is absent.

In addition to one or more of the features described above, or as an alternative, further embodiments of the method may include wherein the one or more disengagement conditions include a wheel blocking risk on the vehicle.

In addition to one or more of the features described above, or as an alternative, further embodiments of the method may include wherein the one or more disengagement conditions include a fault in a vehicle electronic brake system.

In addition to one or more of the features described above, or as an alternative, further embodiments of the method may include wherein after disengaging the axle driven generator from the axle, initiating reengagement of the axle driven generator with the axle in response to an absence of the one or more disengagement conditions.

In addition to one or more of the features described above, or as an alternative, further embodiments of the method may include wherein reengagement of the axle driven generator with the axle includes increasing nominal power of the axle driven generator over time.

Technical effects of embodiments of the present disclosure include the ability to control an axle driven generator used to power a transport refrigeration unit in response to operating conditions of a vehicle fitted with the transport refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

The following descriptions should not be considered limiting in any way. With reference to the accompanying drawings, like elements are numbered alike:

DETAILED DESCRIPTION

A detailed description of one or more embodiments of the disclosure are presented herein by way of exemplification and not limitation with reference to the Figures.

Figure 1:
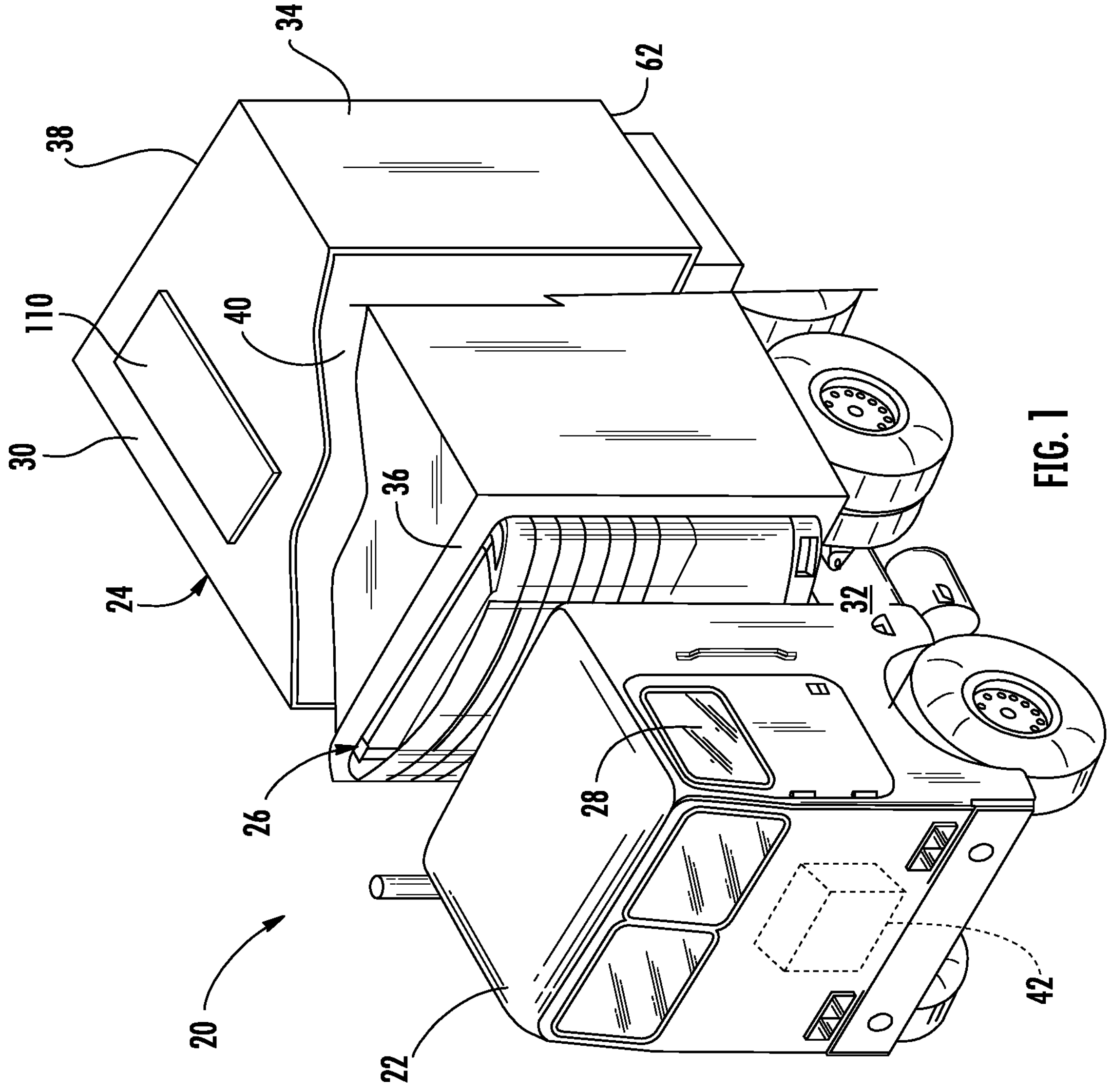
FIG. 1 is a perspective view of a transport refrigeration system having a transport refrigeration unit according to an example embodiment.

Referring to FIG. 1, a transport refrigeration system 20 of the present disclosure is illustrated. In the illustrated embodiment, the transport refrigeration system 20 may include a tractor 22, a trailer 24, and a transport refrigeration unit (TRU) 26. The trailer 24 may be pulled by the tractor 22. The trailer 24 may be a standalone unit that is pulled by the tractor 22, often referred to as a tractor-trailer. The trailer 24 may also be integrated with the tractor 22, often referred to as a refrigerated truck. Embodiments of this disclosure are also applicable to other vehicles equipped with an axle driven generator.

The tractor 22 may include an operator's compartment or cab 28 and a combustion engine 42 which is part of the powertrain or drive system of the tractor 22. In some instances the tractor 22 may be a hybrid or all electric configuration having electric motors to provide propulsive force for the vehicle. In some configurations the TRU system 26 may be engineless. In some embodiments, a small engine or the engine of the tractor 22 may be employed to power or partially power the TRU 26. The trailer 24 may be coupled to the tractor 22 and is thus pulled or propelled to desired destinations. The trailer 24 may include a top wall 30, a bottom wall 32 opposed to and spaced from the top wall 30, two side walls 34 spaced from and opposed to one-another, and opposing front and rear walls 36, 38 with the front wall 36 being closest to the tractor 22. The trailer 24 may further include doors (not shown) at the rear wall 38, or any other wall. The walls 30, 32, 34, 36, 38 together define the boundaries of a cargo compartment 40. Typically, transport refrigeration systems 20 are used to transport and distribute cargo, such as, for example perishable goods and environmentally sensitive goods (herein referred to as perishable goods). The perishable goods may include but are not limited to fruits, vegetables, grains, beans, nuts, eggs, dairy, seed, flowers, meat, poultry, fish, ice, blood, pharmaceuticals, or any other suitable cargo requiring cold chain transport. In the illustrated embodiment, the TRU 26 is associated with a trailer 24 to provide one or more desired environmental parameters, for example temperature, pressure, humidity, carbon dioxide, ethylene, ozone, light exposure, vibration exposure, and other conditions to the cargo compartment 40.

The trailer 24 is generally constructed to store a cargo (not shown) in the compartment 40. The TRU 26 is generally integrated into the trailer 24 and may be mounted to the front wall 36. The cargo is maintained at a desired temperature by cooling of the compartment 40 via the TRU 26 that circulates refrigerated airflow into and through the cargo compartment 40 of the trailer 24. It is further contemplated and understood that the TRU 26 may be applied to any transport compartments (e.g., shipping or transport containers) and not necessarily those used in tractor trailer systems. Furthermore, the trailer 24 may be a part of the of the tractor 22 or constructed to be removed from a framework and wheels (not shown) of the trailer 24 for alternative shipping means (e.g., marine, railroad, flight, and others).

Figure 2:
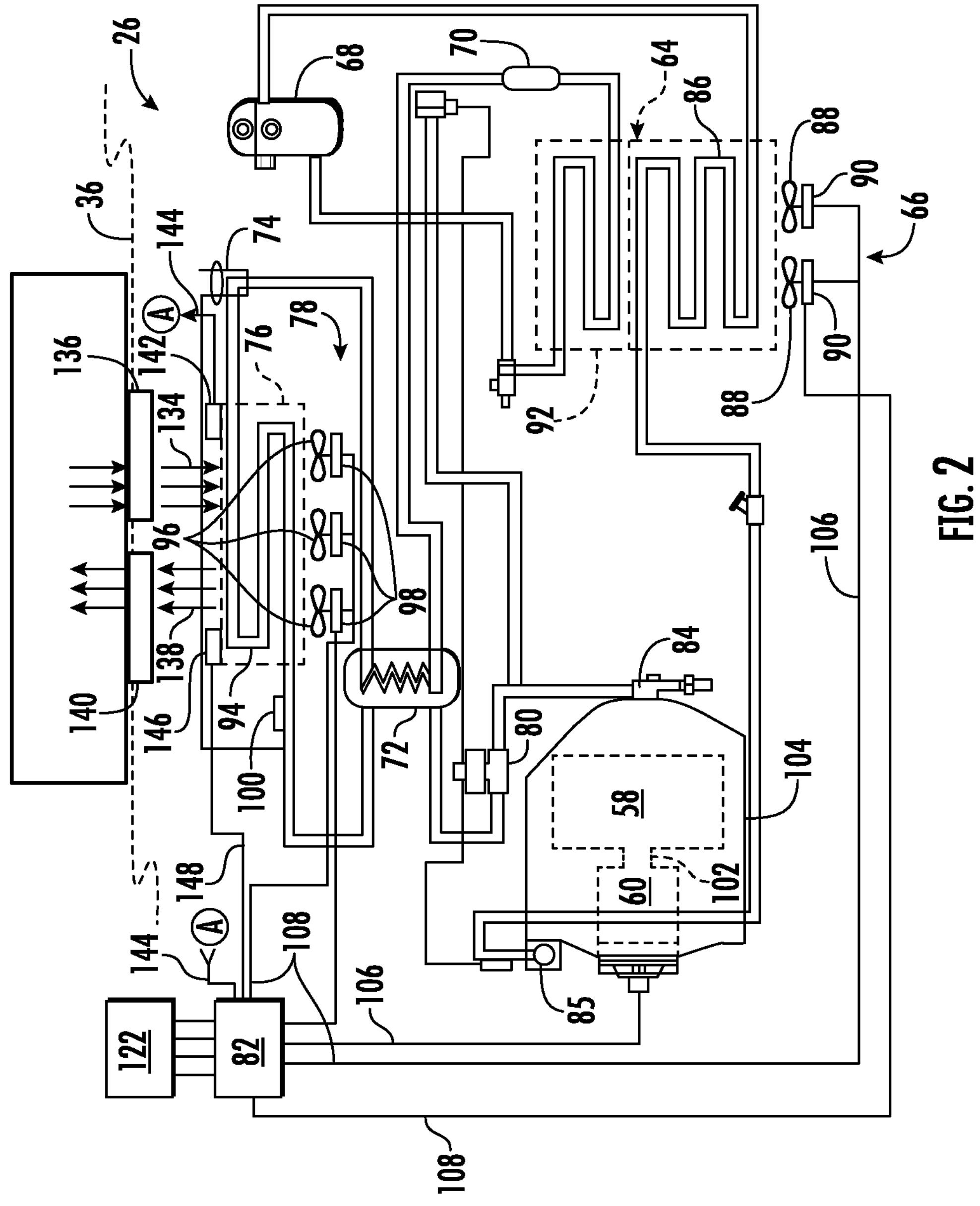
FIG. 2 is a schematic of a transport refrigeration unit according to an example embodiment.

Referring to FIG. 2, components of the TRU 26 may include a compressor 58, an electric compressor motor 60, a heat rejection heat exchanger 64 (e.g., a gas cooler or condenser) that may be air cooled, a condenser fan assembly 66, a receiver 68, a filter dryer 70, a heat exchanger 72, an expansion valve 74, a heat absorption heat exchanger 76 (e.g., an evaporator), an evaporator fan assembly 78, a suction modulation valve 80, and a controller 82 that may include a computer-based processor (e.g., microprocessor) and the like as will be described further herein. Operation of the TRU 26 may best be understood by starting at the compressor 58, where the suction gas (e.g., natural refrigerant, hydro-fluorocarbon (HFC) R-404a, HFC R-134a . . . etc.) enters the compressor 58 at a suction port 84 and is compressed to a higher temperature and pressure. The refrigerant gas is emitted from the compressor 58 at an outlet port 85 and may then flow into tube(s) 86 of the condenser 64.

Air flowing across a plurality of condenser coil fins (not shown) and the tubes 86, cools the gas to its saturation temperature. The air flow across the condenser 64 may be facilitated by one or more fans 88 of the condenser fan assembly 66. The condenser fans 88 may be driven by respective condenser fan motors 90 of the fan assembly 66 that may be electric. By removing latent heat, the refrigerant gas within the tubes 86 condenses to a high pressure and high temperature liquid and flows to the receiver 68 that provides storage for excess liquid refrigerant during low temperature operation. From the receiver 68, the liquid refrigerant may pass through a sub-cooler heat exchanger 92 of the condenser 64, through the filter-dryer 70 that keeps the refrigerant clean and dry, then to the heat exchanger 72 that increases the refrigerant sub-cooling, and finally to the expansion valve 74.

As the liquid refrigerant passes through the orifices of the expansion valve 74, some of the liquid vaporizes into a gas (i.e., flash gas). Return air from the refrigerated space (i.e., cargo compartment 40) flows over the heat transfer surface of the evaporator 76. As the refrigerant flows through a plurality of tubes 94 of the evaporator 76, the remaining liquid refrigerant absorbs heat from the return air, and in so doing, is vaporized and thereby cools the return air.

The evaporator fan assembly 78 includes one or more evaporator fans 96 that may be driven by respective fan motors 98 that may be electric. The air flow across the evaporator 76 is facilitated by the evaporator fans 96. From the evaporator 76, the refrigerant, in vapor form, may then flow through the suction modulation valve 80, and back to the compressor 58. The expansion valve 74 may be thermostatic or electrically adjustable. In an embodiment, as depicted, the expansion valve 74 is thermostatic. A thermostatic expansion valve bulb sensor 100 may be located proximate to an outlet of the evaporator tube 94. The bulb sensor 100 is intended to control the thermostatic expansion valve 74, thereby controlling refrigerant superheat at an outlet of the evaporator tube 94. It is further contemplated and understood that the above generally describes a single stage vapor compression system that may be used for HFCs such as R-404a and R-134a and natural refrigerants such as propane and ammonia. Other refrigerant systems may also be applied that use carbon dioxide ($CO_2$) refrigerant, and that may be a two-stage vapor compression system. In another embodiment, the expansion valve 74 could be an electronic expansion valve. In this case the expansion valve is commanded to a selected position by the controller 82 based on the operating conditions of the vapor compression cycle and the demands of the system.

A bypass valve (not shown) may facilitate the flash gas of the refrigerant to bypass the evaporator 76. This will allow the evaporator coil to be filled with liquid and completely 'wetted' to improve heat transfer efficiency. With $CO_2$ refrigerant, this bypass flash gas may be re-introduced into a mid-stage of a two-stage compressor 58.

The compressor 58 and the compressor motor 60 may be linked via an interconnecting drive shaft 102. The compressor 58, the compressor motor 60 and the drive shaft 102 may all be sealed within a common housing 104. The compressor 58 may be a single compressor. The single compressor may be a two-stage compressor, a scroll-type compressor or other compressors adapted to compress HFCs or natural refrigerants. The natural refrigerant may be $CO_2$, propane, ammonia, or any other natural refrigerant that may include a global-warming potential (GWP) of about one (1).

Continuing with FIG. 2, with continued reference to FIG. 1. FIG. 2 also illustrates airflow through the TRU 26 and the cargo compartment 40. Airflow is circulated into and through and out of the cargo compartment 40 of the container 24 by means of the TRU 26. A return airflow 134 flows into the TRU 26 from the cargo compartment 40 through a return air intake 136, and across the evaporator 76 via the fan 96, thus conditioning the return airflow 134 to a selected or predetermined temperature. The conditioned return airflow 134, now referred to as supply airflow 138, is supplied into the cargo compartment 40 of the container 24 through the refrigeration unit outlet 140, which in some embodiments is located near the top wall 30 of the container 24. The supply airflow 138 cools the perishable goods in the cargo compartment 40 of the container 24. It is to be appreciated that the TRU 26 can further be operated in reverse to warm the container 24 when, for example, the outside temperature is very low.

A temperature sensor 142 (i.e., thermistor, thermocouples, RTD, and the like) is placed in the air stream, on the evaporator 76, at the return air intake 136, and the like, to monitor the temperature return airflow 134 from the cargo compartment 40. A sensor signal indicative of the return airflow temperature denoted RAT is operably connected via line 144 to the TRU controller 82 to facilitate control and operation of the TRU 26. Likewise, a temperature sensor 146 is placed in the supply airflow 138, on the evaporator 76, at the refrigeration unit outlet 140 to monitor the temperature of the supply airflow 138 directed into the cargo compartment 40. Likewise, a sensor signal indicative of the supply airflow temperature denoted SAT 14 is operably connected via line 148 to the TRU controller 82 to facilitate control and operation of the TRU 26.

The TRU 26 may be powered by various power sources denoted generally as 122. The power sources 122 may include, but not be limited to, an energy storage device (e.g., a battery), an engine driven generator, an axle driven generator, solar panels, shore power (when the TRU 26 is not in motion), a fuel cell, etc. Each of the power sources 122 may be configured to selectively power the TRU 26 including compressor motor 60, the condenser fan motors 90, the evaporator fan motors 98, the controller 82, and other components of the TRU 26 that may include various solenoids and/or sensors). The controller 82, through a series of data and command signals over various pathways 108 may, for example, control the application of power to the electric motors 60, 90, 98 as dictated by the cooling needs of the TRU 26.

The TRU 26 may include an AC or DC architecture with selected components employing alternating current (AC), and others employing direct current (DC). For example, in an embodiment, the motors 60, 90, 98 may be configured as AC motors, while in other embodiments, the motors 60, 90, 98 may be configured as DC motors. The operation of the of the power sources 122 as they supply power to the TRU 26 may be managed and monitored by the controller 82.

Figure 3:
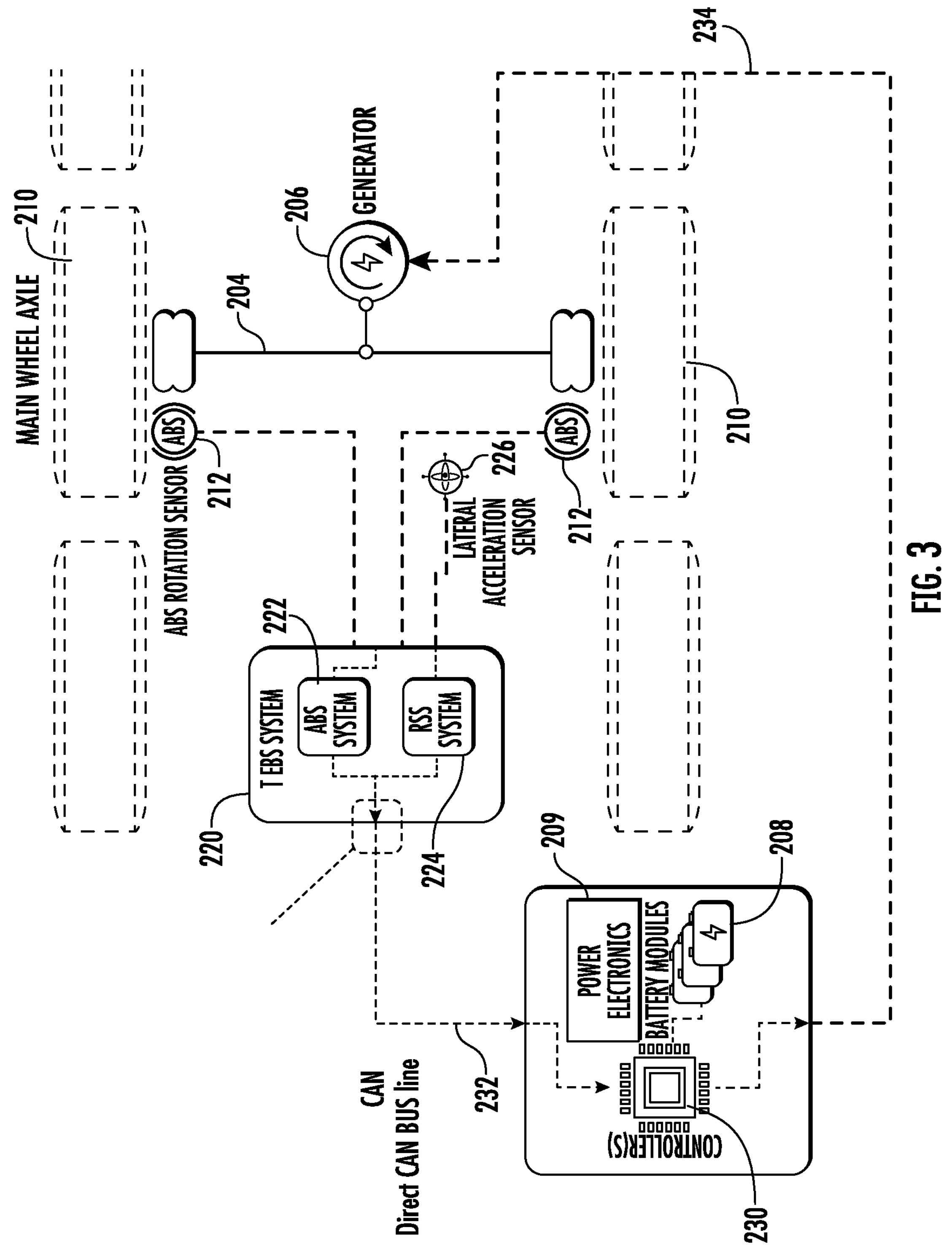
FIG. 3 depicts interconnections between an axle driven generator and various components of the transport refrigeration system according to an example embodiment.

FIG. 3 depicts interconnections between and various components of the transport refrigeration system 20 according to an example embodiment. As shown in FIG. 3, an axle 204 of trailer 24 (FIG. 1) is fitted with an axle driven generator 206. The axle driven generator 206 serves as a power source 122 for supplying power to the TRU 26. Power output from the axle driven generator 206 may be used to charge battery 208. The battery 208 may include a plurality of batteries, battery modules, battery cells, etc. The term battery is intended to include a variety of battery configurations. The battery 208 serves as a power source 122 for supplying power to the TRU 26.

A trailer electronic braking system (T-EBS) 220 includes an antilock brake system (ABS) 222 and a roll stability support (RSS) system 224. The ABS 222 and RSS system 224 are commercially available units. One or both wheels 210 of the axle 204 is equipped with an ABS rotation sensor 212. The ABS rotation sensor(s) 212 sense rotation or speed of each wheel 210. The ABS rotation sensor(s) 212 provide a wheel speed signal to the ABS 222 to control antilock braking of the trailer 24. A lateral acceleration sensor 226 provides an acceleration signal to the RSS system 224 to provide roll stability support for the trailer 24.

The T-EBS 220 is in communication with a controller 230. The controller 230 may include a computer-based processor (e.g., microprocessor). The controller 230 may be used to monitor the battery 208. The controller 230 may be implemented by the TRU controller 82. Communication between the T-EBS 220 and the controller 230 may be a wired connection, such as a CAN bus 232. The controller 230 is also in communication with the axle driven generator 206 over line 234 (e.g., a wiring harness). The controller 230 sends commands to the axle driven generator 206 as described in further detail herein.

The controller 230 may include or communicate with power electronics 209. The power electronics 209 provide for voltage and/or current control, such as AC to DC, AC to AC, DC to DC and/or DC to AC conversions. These conversions may be needed to condition power from multiple sources to power the TRU 26 and/or charge the battery 208. The power electronics 209 may also include a rectifier-inverter, filter, etc.

The axle driven generator 206 applies torque to the axle 204 when the axle driven generator 206 is generating power. The torque applied by the axle driven generator 206 may lead to wheel blocking of the trailer wheels 210 in certain situations. For example, there may be a risk of wheel blocking if the trailer 24 is traveling on a very low grip road (e.g., iced road) and the axle driven generator 206 is generating power.

Figure 4:
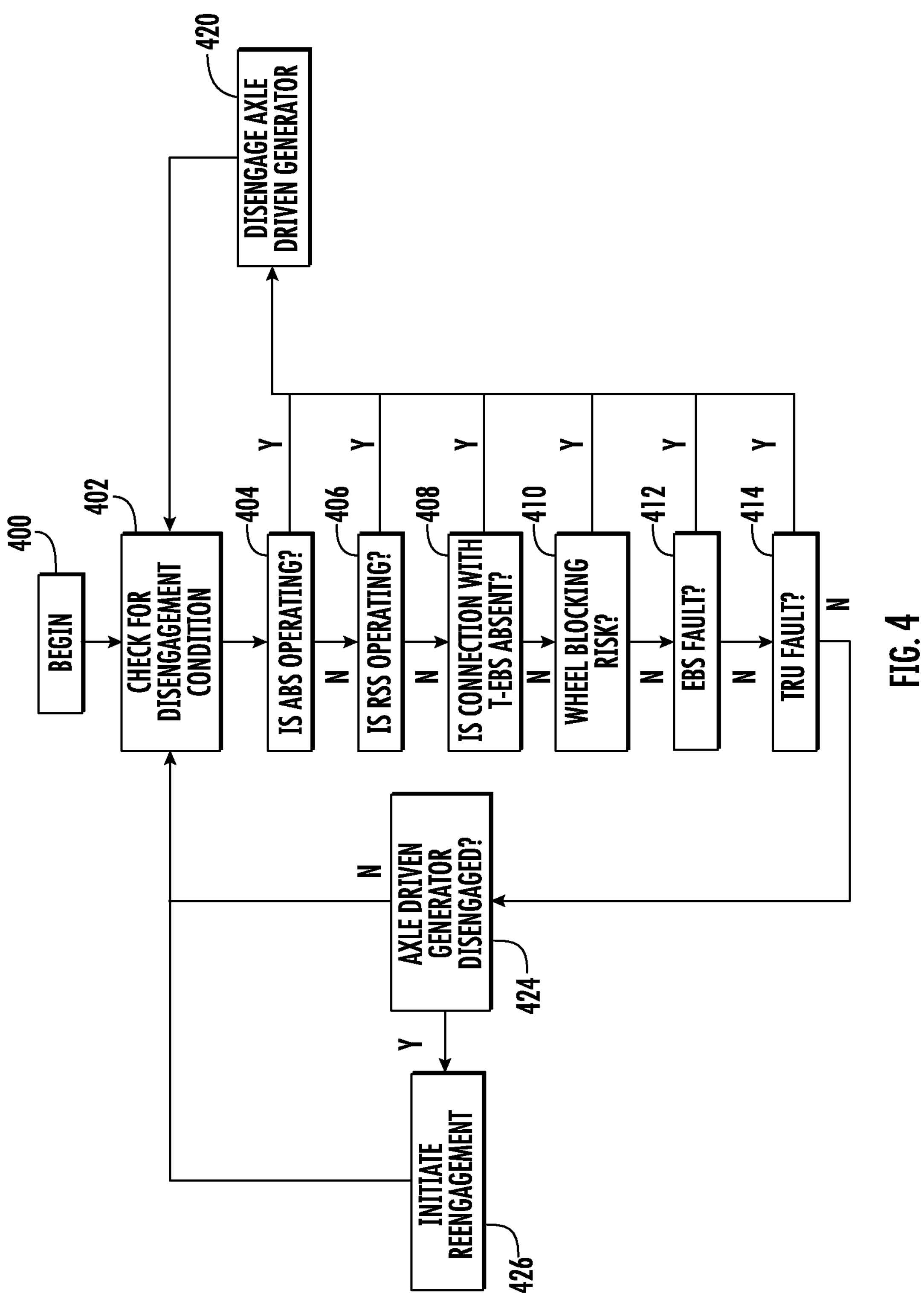
FIG. 4 is a flowchart of a process for managing an axle driven generator according to an example embodiment.

FIG. 4 is a flowchart of a process for managing the axle driven generator 206 to avoid wheel blocking according to an example embodiment. The process of FIG. 4 may be implemented by controller 230. The process begins at 400 and may be initiated upon powering the T-EBS 220 or detection of movement of the trailer 24 by ABS rotation sensor(s) 212. At 402, the controller 230 begins determining if a disengagement condition exists. A disengagement condition is an event under which the axle driven generator 206 is to be disengaged from the axle 204. Disengagement of the axle driven generator 206 from the axle 204 refers to reducing or eliminating torque from the axle driven generator 206 on the axle 204.

At 404, the controller 230 determines if the ABS 222 is operating, meaning the ABS 222 is actively controlling brakes of the trailer 24. If the ABS 222 is actively controlling brakes of the trailer 24, flow proceeds to 420.

At 406, the controller 230 determines if the RSS system 224 is operating, meaning the RSS system 224 is actively controlling stability of the trailer 24. If the RSS system 224 is actively controlling stability of the trailer 24, flow proceeds to 420.

At 408, the controller 230 determines if a connection with the T-EBS 220 is absent. The controller 230 can confirm the connection with the T-EBS 220 by periodically sending confirmation messages over the CAN bus 232. If a connection with the T-EBS 220 is absent, flow proceeds to 420.

At 410, the controller 230 determines if there is a wheel blocking risk. A wheel blocking risk may be indicated by sudden deceleration of the trailer 24 (e.g., a deceleration greater than limit). The deceleration of the trailer 24 may be sensed, for example, by an acceleration sensor or the ABS rotation sensor 212. Deceleration of the trailer 24 may also be sensed by measuring a frequency of the output of the axle driven generator 206. By knowing the gearbox ratio of the axle driven generator 206 and the wheel size of the trailer 24, the frequency of the output of the axle driven generator 206 is a good indication of the speed of the trailer 24. If sudden deceleration of the trailer 24 is detected, flow proceeds to 420.

At 412, the controller 230 determines if the T-EBS 220 has experienced a fault. The controller 230 communicates with the T-EBS 220 over the CAN bus 232. A fault in the T-EBS 220 is transmitted to the controller 230. If the T-EBS 220 has experienced a fault, flow proceeds to 420.

At 414, the controller 230 determines if TRU 26 has experienced a fault. The fault may be detected by the controller 230 (e.g., a fault in the battery 208). The controller 230 may also detect a fault in the TRU 26 by communication with the TRU 26 controller 82 over a wired or wireless connection. If the TRU 26 has experienced a fault, flow proceeds to 420.

If any of the disengagement conditions are present at 404, 406, 408, 410, 412 or 414, the process flows to 420. At 420, the controller 230 disengages the axle driven generator 206 from the axle 204. As noted above, disengaging the axle driven generator 206 from the axle 204 refers to reducing or eliminating torque from the axle driven generator 206 on the axle 204. This may be done in a variety of ways depending on the nature of the axle driven generator 206. For example, if the axle driven generator 206 is an induction motor operating as a generator, the controller 230 ceases excitation to the axle driven generator 206 windings. In another embodiment, the axle driven generator 206 is a permanent magnet synchronous motor. In this example, the controller 230 commands the axle driven generator 206 to cease generating current. In another embodiment, the axle driven generator 206 is a switched reluctance motor. In this example, the controller 230 commands the axle driven generator 206 to stop generating reactive power. In other embodiments, a clutch (e.g., an electromagnetic clutch) may be used to mechanically disengage the axle driven generator 206 from the axle 204.

From 420, the process reverts back to 402 where the controller 230 will continue to monitor for the disengagement conditions through 404, 406, 408, 410, 412 and 414. If no disengagement conditions are detected, the process flows to 424.

At 424, the controller 230 determines if the axle driven generator 206 is currently disengaged from the axle 204. If the axle driven generator 206 is currently engaged with the axle 204, then flow proceeds to 402.

If at 424 the axle driven generator 206 is currently disengaged with the axle 204, then flow proceeds to 426 where the controller 230 performs reengagement of the axle driven generator 206 with the axle 204. The reengagement includes gradually increasing the load of the axle driven generator 206 on the axle 204 over time. For example, after a 60 seconds, the axle driven generator 206 may be set to 35% of a nominal power. After 90 seconds, the axle driven generator 206 may be set to 65% of a nominal power. After 120 seconds, the axle driven generator 206 may be set to 100% of a nominal power. The controller 230 may check the disengagement conditions through 404, 406, 408, 410, 412 and 414 prior to increasing nominal power of the axle driven generator 206.

The embodiments described herein are directed to an example of a trailer fitted with a transport refrigeration unit. Embodiments disclosed herein may also be applicable to other vehicles having axle driven generators.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:

a trailer having an axle;

a transport refrigeration unit mounted to the trailer, transport refrigeration unit configured to cool a cargo compartment of the trailer;

an axle driven generator connected to the axle, the axle driven generator configured to provide power to the transport refrigeration unit;

a controller in communication with the axle driven generator, the controller configured to disengage the axle driven generator from the axle in response to the presence of one or more disengagement conditions;

wherein the one or more disengagement conditions includes at least one of:

an antilock brake system of the trailer actively controlling brakes of the trailer;

a roll stability support system of the trailer actively controlling stability of the trailer;

a connection with a trailer electronic brake system is absent;

a wheel blocking risk on the trailer;

a fault in a trailer electronic brake system;

a fault in the transport refrigeration unit.

2. The transport refrigeration system of claim 1 wherein the one or more disengagement conditions include an antilock brake system of the trailer actively controlling brakes of the trailer.

3. The transport refrigeration system of claim 1 wherein the one or more disengagement conditions include a roll stability support system of the trailer actively controlling stability of the trailer.

4. The transport refrigeration system of claim 1 wherein the one or more disengagement conditions include a connection with a trailer electronic brake system is absent.

5. The transport refrigeration system of claim 1 wherein the one or more disengagement conditions include a wheel blocking risk on the trailer.

6. The transport refrigeration system of claim 1 wherein the one or more disengagement conditions include a fault in a trailer electronic brake system.

7. The transport refrigeration system of claim 1 wherein the one or more disengagement conditions include a fault in the transport refrigeration unit.

8. The transport refrigeration system of claim 1 wherein after disengaging the axle driven generator from the axle, the controller initiates reengagement of the axle driven generator with the axle in response to an absence of the one or more disengagement conditions.

9. The transport refrigeration system of claim 8 wherein reengagement of the axle driven generator with the axle includes increasing nominal power of the axle driven generator over time.

10. A method of controlling an axle driven generator connected to an axle of a vehicle, the method comprising:

disengaging the axle driven generator from the axle in response to the presence of one or more disengagement conditions;

wherein the one or more disengagement conditions includes at least one of:

an antilock brake system of the trailer actively controlling brakes of the trailer;

a roll stability support system of the trailer actively controlling stability of the trailer;

a connection with a trailer electronic brake system is absent;

a wheel blocking risk on the trailer;

a fault in a trailer electronic brake system;

a fault in the transport refrigeration unit.

11. The method of claim 10 wherein the one or more disengagement conditions include an antilock brake system actively controlling brakes of the vehicle.

12. The method of claim 10 wherein the one or more disengagement conditions include a roll stability support system actively controlling stability of the vehicle.

13. The method of claim 10 wherein the one or more disengagement conditions include a connection with an electronic brake system is absent.

14. The method of claim 10 wherein the one or more disengagement conditions include a wheel blocking risk on the vehicle.

15. The method of claim 10 wherein the one or more disengagement conditions include a fault in a vehicle electronic brake system.

16. The method of claim 10 wherein after disengaging the axle driven generator from the axle, initiating reengagement of the axle driven generator with the axle in response to an absence of the one or more disengagement conditions.

17. The method of claim 16 wherein reengagement of the axle driven generator with the axle includes increasing nominal power of the axle driven generator over time.

* * * * *